United States Patent
Yoshihara et al.

(10) Patent No.: US 6,781,628 B1
(45) Date of Patent: Aug. 24, 2004

(54) SOLID-STATE IMAGE PICKUP DEVICE AND METHOD OF DRIVING THE SAME

(75) Inventors: Satoshi Yoshihara, Kanagawa (JP); Masahide Hirama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/199,300

(22) Filed: Nov. 25, 1998

(30) Foreign Application Priority Data

Nov. 28, 1997 (JP) .......................................... P9-327486

(51) Int. Cl.[7] ........................... H04N 5/335; H04N 1/46
(52) U.S. Cl. ....................... 348/316; 348/324; 358/514
(58) Field of Search ................. 348/311–317, 321–324, 348/272, 282, 283, 294; 358/513, 514, 482, 483

(56) References Cited

U.S. PATENT DOCUMENTS

| | | | | | |
|---|---|---|---|---|---|
| 5,241,377 A | * | 11/1991 | Kaneda | ...................... | 348/265 |
| 5,189,498 A | * | 2/1993 | Sakakibara | ................ | 257/249 |
| 5,995,249 A | * | 7/1995 | Sato et al. | ................... | 358/514 |
| 6,078,685 A | * | 8/1995 | Kawai et al. | ................ | 382/167 |
| 5,841,554 A | * | 11/1998 | Hasegawa | .................... | 358/513 |
| 5,870,142 A | * | 2/1999 | Noda et al. | .................. | 348/266 |

FOREIGN PATENT DOCUMENTS

JP          36129462 A    *  12/1986   ............ H04N/1/04

* cited by examiner

Primary Examiner—Andrew Christensen
Assistant Examiner—Nhan Tran
(74) Attorney, Agent, or Firm—Sonnenschein, Nath & Rosenthal LLP

(57) ABSTRACT

A solid-state image pickup device includes image pickup means having at least two sensor arrays disposed so as to be adjacent to each other, and horizontal charge transfer means having at least two horizontal registers which are disposed so as to be adjacent to the image pickup means and provided in association with the at least two sensor arrays respectively. A method of driving the solid-state image pickup device transfers the charges picked up at the respective pixels of the sensor arrays to the corresponding horizontal registers. After all the charges picked up at the respective pixels of the sensor arrays are transferred to the horizontal registers, the charges are successively transferred in the horizontal direction.

1 Claim, 13 Drawing Sheets

SOLID-STATE IMAGE PICKUP DEVICE AND METHOD OF DRIVING THE SAME

BACKGROUND OF THE INVENTION

The present invention relates to a solid-state image pickup device for transferring charges which are picked up in a pixel-array fashion, thereby obtaining an image signal, and a method of driving the solid-state image pickup device.

In a solid-state image pickup device having plural sensor arrays in one chip (hereinafter referred to as "CCD sensor"), a horizontal register for transfer of charges is provided to each sensor array to read out a signal charge picked up at each pixel of the sensor array in a charge-to-voltage converter.

FIG. 1 is a schematic plan view showing the construction of a conventional CCD sensor. That is, the CCD sensor includes sensor arrays e, f, g corresponding to three primary colors of R (red), G (green) and B (blue) for example, and horizontal registers h, i, j, k, l, m, respective two of which are disposed at both sides of each sensor array e, f, g to separately transmit the charges at odd sides and the charges at even sides of the respective pixels of each sensor array e, f, g.

In such a CCD sensor, the charge corresponding to input light is picked up at each pixel of each sensor array e, f, g, and then the charges corresponding to the pixels at the even sides of each sensor array e, f, g are transferred to each horizontal register h, j, l. Thereafter, the charges correspondence to the pixels at the odd sides of each sensor array e, f, g are transferred to each horizontal register i, k, m. After the charges of all the pixels are transferred to the horizontal registers h, i, j, k, l, m, a voltage is successively applied to φh2 the charges in the horizontal direction. The charges thus transferred is taken out as an output signal by the charge-to-voltage converter (not shown).

In the conventional CCD sensor as described above, however, the distance between the centers of the pixels of each sensor must be several times as large as the sensor size because the charge-transferring horizontal registers are disposed between the respective sensor arrays. Particularly in a CCD sensor for transferring charges while separating the charges between the odd side and the even side, two horizontal registers are disposed between the respective sensors, resulting in further increase of the distance between the centers of the pixels.

For example, in the case of FIG. 1, the interval between the sensor arrays e and f and the interval between the sensor arrays f and g are set to the distance corresponding to 8 lines. Therefore, when an image is picked up, the output signals of the respective sensor arrays which are picked up at the same timing are spatially displaced from one another (in the case of FIG. 1, the displacement amount corresponds to 8 lines), resulting in various disadvantages such as color displacement, etc.

Therefore, in order to avoid such spatial displacements between the output signals of the sensor arrays, it is necessary that a memory is provided at a subsequent stage of the charge-to-voltage converter to temporarily store the output signals in the memory and then take out the output signals, thereby correcting the spatial displacements. However, as the interval between the sensor arrays is increased, the memory capacity to be required is larger, resulting in rise-up of the cost.

SUMMARY OF THE INVENTION

The present invention is directed to a solid-state image pickup device and a method of driving the solid-state image pickup device, which have been implemented in order to solve the problem of the related art as described above.

According to a first aspect of the present invention, a solid-state image pickup device comprises image pickup means having a first pixel array and a second pixel array which are disposed so as to be adjacent to each other, and first horizontal charge transfer means disposed so as to be adjacent to the image pickup means, wherein the first horizontal charge transfer means has first and second horizontal charge transfer arrays corresponding to the first and second pixel arrays.

According to a second aspect of the present invention, in the solid-state image pickup device of the first aspect of the present invention, the first and second horizontal charge transfer arrays are disposed so as to be adjacent to the second pixel array in this order, and there is provided vertical charge transfer means for transferring to the first horizontal charge transfer array each charge from each pixel of the first pixel array which is not adjacent to the first horizontal charge transfer array.

According to a third aspect of the present invention, in the solid-state image pickup device of the first aspect of the present invention, the horizontal charge transfer means has two horizontal charge transmission arrays for either of the first and second pixel arrays or each of both the first and second pixel arrays.

According to a fourth aspect of the present invention, in the solid-state image pickup device of the first aspect of the present invention, the image pickup means further includes a third pixel array which is disposed so as to be adjacent to the first pixel array at the opposite side to the second pixel array, and the solid-state image pickup device includes the first horizontal charge transfer means which is disposed so as to be adjacent to the second pixel array of the pixel pickup means and has the first and second charge transfer arrays which are provided in association with the first and second pixel arrays respectively, second horizontal charge transfer means which i disposed so as to be adjacent to the third pixel array of the image pickup means and has a third horizontal charge transmission array provided in association with the third pixel array, and vertical charge transfer means for transferring each charge from each pixel of the first pixel array to the first horizontal transfer array.

According to a fifth aspect of the present invention, in the solid-state pickup device of the fourth aspect of the present invention, each of the first horizontal charge transfer array, the second horizontal charge transfer array and the third horizontal charge transfer array has two horizontal charge transfer arrays which correspond to two different sets of every other pixels in the corresponding one of the first pixel array, the second pixel array and the third pixel array.

According to a sixth aspect of the present invention, a solid-state image pickup device includes: image pickup means comprising a first pixel array, a second pixel array and a third pixel array which are disposed so as to be adjacent to one another in this order; second horizontal charge transfer means comprising two horizontal charge transfer arrays which are disposed so as to be adjacent of the first pixel array and the third pixel array of the image pickup means respectively and correspond to two different sets of every other pixels of the second pixel array respectively; the first horizontal charge transfer means comprising two horizontal charge transfer arrays which are disposed so as to be adjacent to the one horizontal transfer array of the second horizontal charge transfer means which is disposed so as to be adjacent to the first pixel array of the image pickup means, and correspond to two different sets of every other pixels of the first pixel array; third horizontal charge transfer means comprising two horizontal charge transfer arrays which are disposed so as to be adjacent to the other horizontal transfer array of the second horizontal charge transfer means which is disposed so as to be adjacent to the third pixel array of the image pickup means, and correspond to two different sets of every other pixels of the third pixel array; and vertical charge transfer means for transferring the charge from each pixel of the second pixel array of the image pickup means to each of the two horizontal charge transfer arrays corresponding to the second horizontal charge transfer means.

According to a seventh aspect of the present invention, a method of driving a solid-state image pickup device including image pickup means having first and second pixel arrays arranged so as to be adjacent to each other, and horizontal charge transfer means having first and second horizontal charge transfer arrays which are disposed so as to be adjacent to the image pickup means and correspond to at least the first and second pixel arrays respectively, comprises: a first step of picking up the charge at each pixel of the first and second pixel arrays; a second step of transferring charges picked up at some or all of the pixels of the first and second pixel arrays to the corresponding first and second horizontal charge transfer arrays; a third step of successively transferring in the horizontal direction the charges which are transferred to the first and second horizontal charge transfer arrays in the second step.

According to an eighth aspect of the present invention, the solid-state image-pickup device driving method of the seventh aspect of the present invention further comprises a step of transferring to vertical charge transfer means the charges picked up at some or all of the pixels of the first pixel array which is not adjacent to the horizontal charge transfer means after the first step and before the second step, and transferring the charges picked up at some or all of the pixels of the second pixel array to a preceding stage of the second horizontal charge transfer array.

According to a ninth aspect of the present invention, in the solid-state image pickup device driving method according to the seventh aspect of the present invention, some of the pixels of the first and second pixel arrays mean either of odd pixels or even pixels.

DETAILED DESCRIPTION OF THE PREFERRED EMBODIMENTS

A solid-state image pickup device and a driving method therefor according to preferred embodiments of the present invention will be described hereunder with reference to the accompanying drawings. In the following embodiments, it is assumed that the present invention is applied to a CCD sensor which is mainly provided with sensor arrays of 3 lines.

Figure 2:
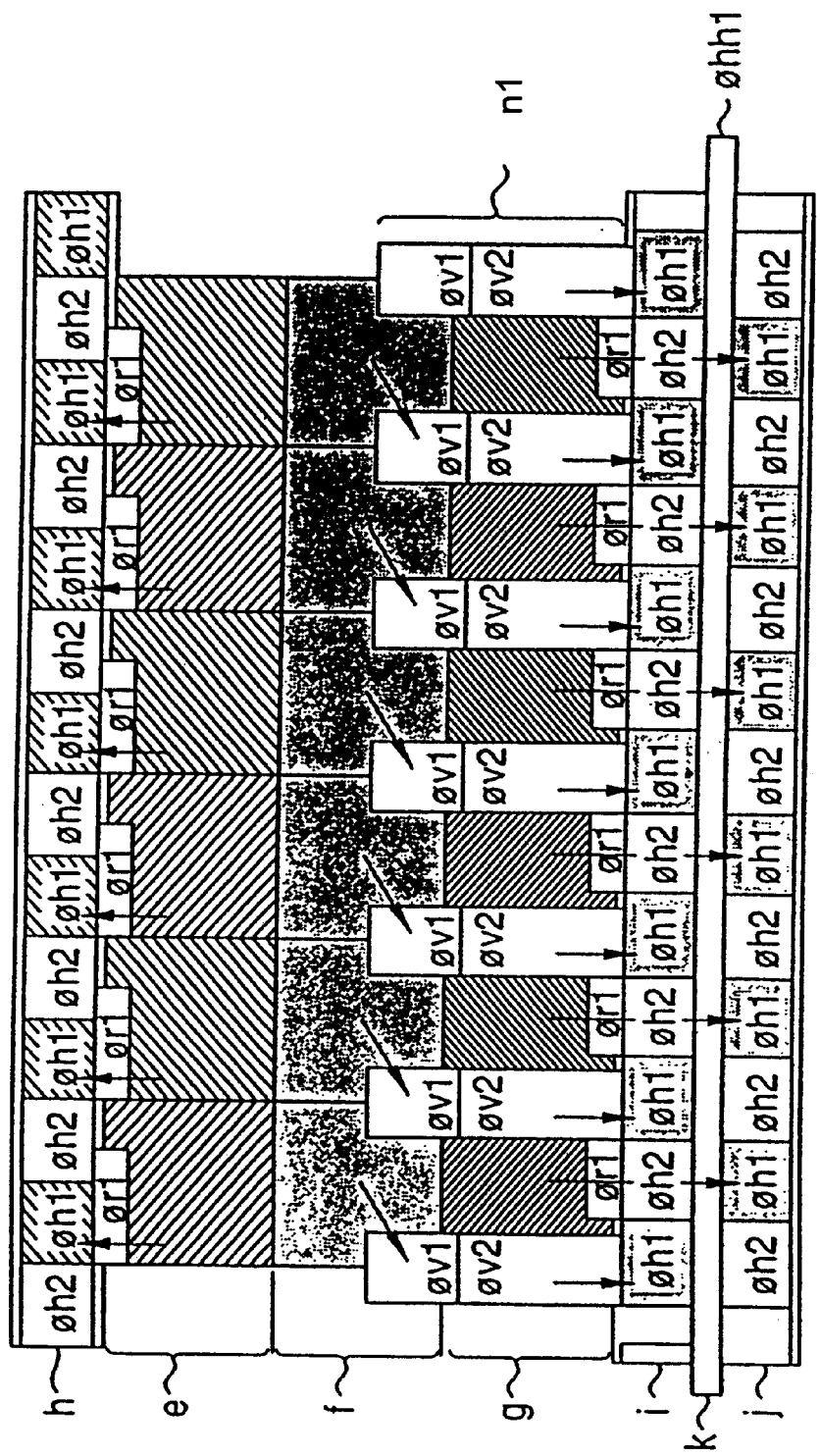
FIG. 2 is a schematic plan view showing a first embodiment of the present invention.

FIG. 2 is a schematic view showing a first embodiment. A CCD sensor shown in FIG. 2 includes sensor arrays e, f, g which are arranged in association with three primary colors of R (red), G (green) and B (blue) so as to be adjacent to one another in this order, a horizontal register h which is disposed so as to be adjacent to the sensor array e and receives and transfer charges from the respective pixels of the sensor array e, a horizontal register i which is disposed so as to be adjacent to the sensor array g and receives and transfers the charges from the respective pixels of the sensor array f, and a horizontal register j which is disposed so as to be adjacent to the horizontal register i and receives and transfers the charges from the respective pixels of the sensor array g.

The CCD sensor of this embodiment is provided with a vertical register n for transferring the charges from the respective pixels of the sensor array f disposed at the center to the horizontal register i, and an inter-horizontal-register transfer register k disposed between the horizontal register i and the horizontal register j.

A two-phase driving voltage φh1, φh2 is applied to each of the horizontal registers h, i, j to successively transfer the charges in the horizontal direction. Further, a voltage φhh1 is applied to the inter-horizontal-register transfer register k to control flow of charges from the horizontal register i to the horizontal register j.

A transfer gate is provided between each pixel of the sensor array e and the horizontal register h and between each pixel of the sensor array g and the horizontal register i, and a voltage of φr1 is applied to these transfer gates so that the charges which are picked up at the respective pixels can be transferred to the horizontal register h and the horizontal register i.

Further, a two-phase driving voltage φv1, φv2 is applied to a vertical register n so that the charges picked up at the respective pixels of the sensor array f can be transferred to the horizontal register i.

In this embodiment, three sensor arrays e, f and g are disposed so as to be adjacent to one another in this order as described above, and thus the spatial displacement in the read-out of the pickup charges can be suppressed to the very small level. The three sensor arrays e, f and g are preferably disposed so be adjacent to one another, however, they are not necessarily required to be completely adjacent to one another. For example, they may be disposed so as to be away from one another at intervals of two to three lines, for examples.

Next, the specific driving method of the CCD sensor will be described.

Figure 3A:
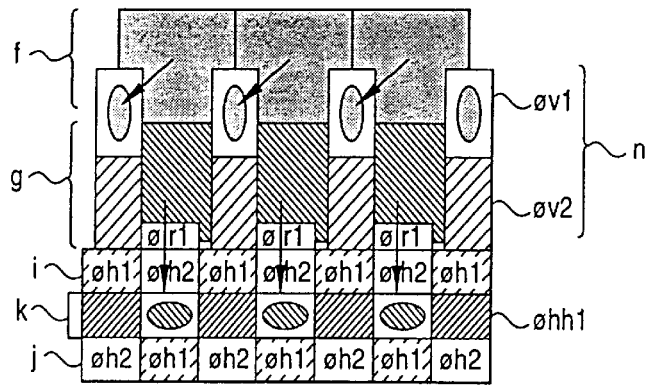
FIGS. 3A to 3C are schematic diagrams showing a transfer process of a main part of the first embodiment.
Figure 3B:
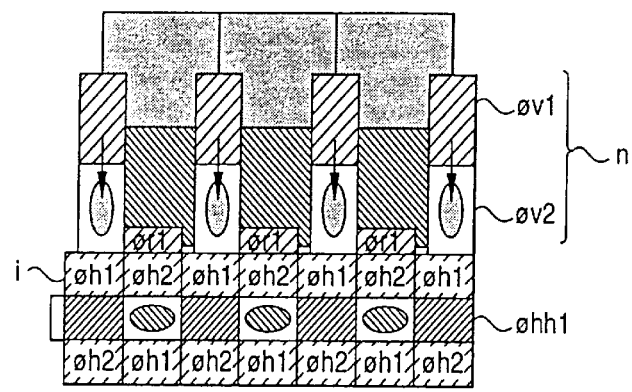
Figure 3C:
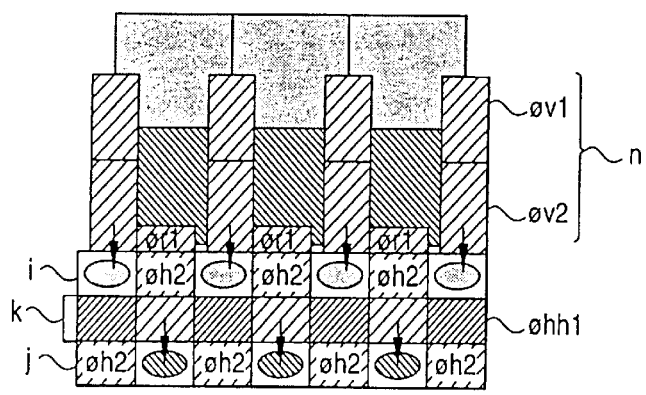
Figure 4:
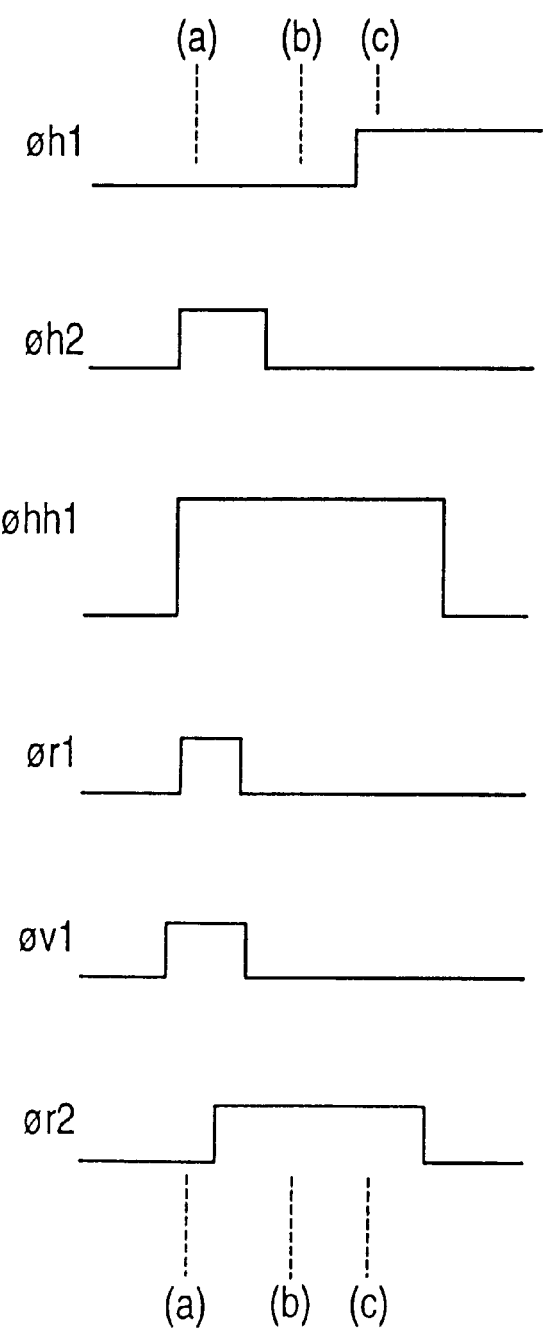
FIG. 4 is a timing chart for transfer in the first embodiment.

FIGS. 3A to 3C are schematic diagrams showing a transfer process of the main part in the step order, and FIG. 4 is a timing chart for transfer. FIGS. 3A to 3C show the transfer process of charges stocked in the sensor arrays f and g. In FIG. 4, the charges are illustrated in an elliptical shape for convenience's sake of the description.

First, when φh1 is set to Low, φh2 is set to High, φhh1 is set to High, φr1 is set to High, φv1 is set to High and φv2 is set to Low at a timing as shown by (a) of FIG. 4, charges are transferred from the respective pixels of the sensor array f to the vertical register n and charges are transferred from the respective pixels of the sensor array g to the inter-horizontal-register transfer register k as shown in FIG. 3A.

The setting of φr1 to High at this timing causes transfer of the charges at the respective pixels of the sensor array e of FIG. 2 to the horizontal register h.

Next, when φh1 is set to Low, φh2 is set to Low, φhh1 is set to High, φr1 is set to Low, φv1 is set to Low and φv2 is set to High at a timing as shown by (b) of FIG. 4, the charges transferred to the vertical register n are transferred to a preceding stage of the horizontal register i as shown in FIG. 3B.

Subsequently, when φh1 is set to High, φh2 is set to Low, φhh1 is set to High, φr1 is set to Low, φv1 is set to Low and φv2 is set to High as shown by (C) of FIG. 4, the charges are transferred from the vertical register n to the horizontal register i and the charges transferred to the inter-horizontal-register transfer register k are transferred to the horizontal register j as shown in FIG. 3C. Through the above operation, all the charges picked up at the respective pixels of each sensor array are allowed to be transferred to the corresponding horizontal registers. Thereafter, the charge can be transferred in the horizontal direction by successively applying φfh1 and φh2.

Through the above transfer operation, the charge picked up at each pixel of each sensor can be output with no occurrence of time lag between the sensor arrays e, f, g. Further, since the sensor arrays e, f, g are disposed so as to be adjacent to one another the spatial displacement in the read-out of the charges can be suppressed to the very small level, and occurrence of color displacement, etc. can be prevented even when neither a memory nor a correction circuit are provided to the rear stage of the charge-to-voltage converter (not shown).

Next, a second embodiment according to the present invention will be described.

Figure 5:
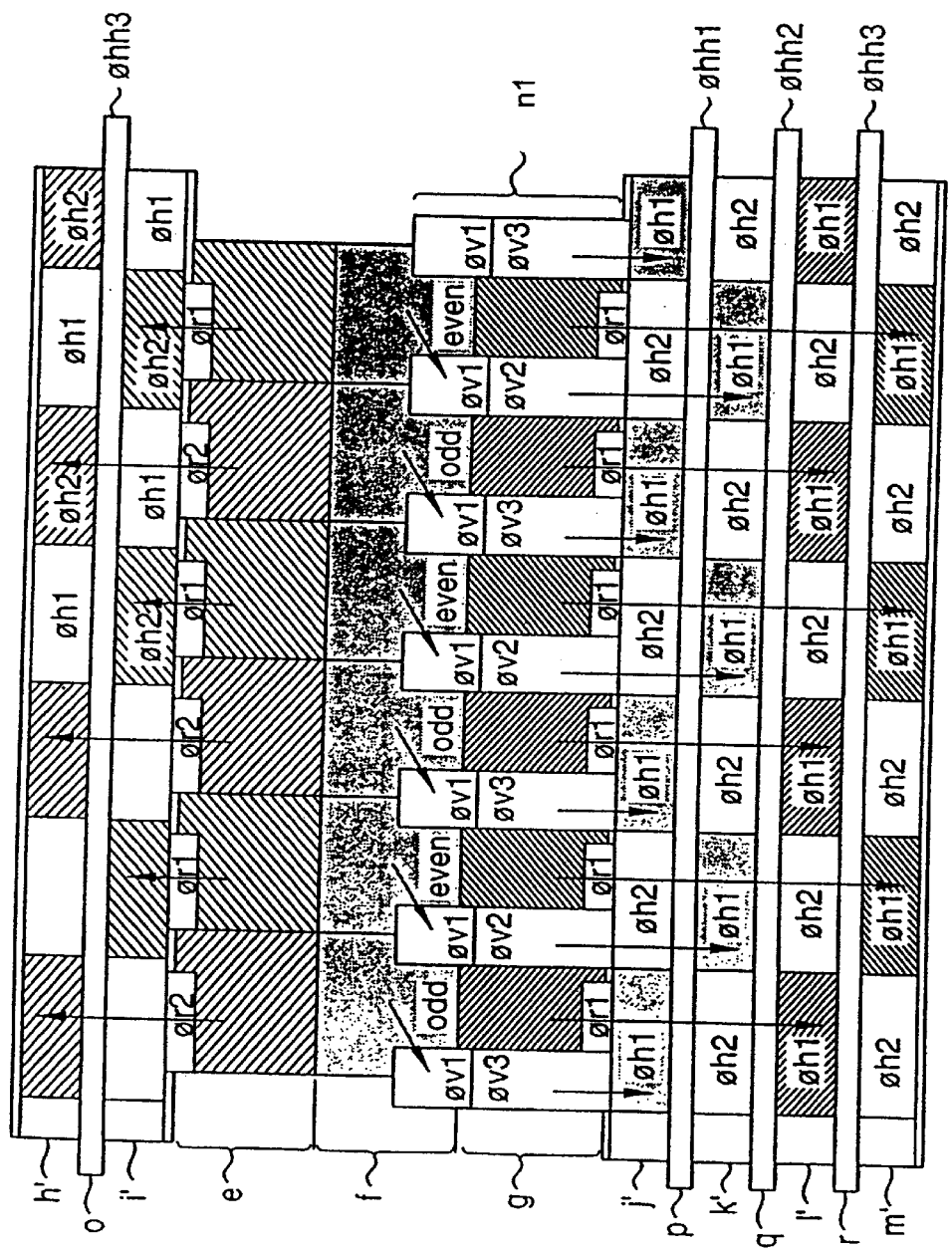
FIG. 5 is a schematic plan view showing a second embodiment according to the present invention.

FIG. 5 is a schematic diagram showing a CCD sensor of the second embodiment. The CCD sensor includes sensor arrays e, f, g which are disposed in association with the primary three colors R (red), G (green) and B (blue) so as to be adjacent to one another in this order, horizontal registers h' and i' which are disposed so as to be adjacent to the sensor e and receives and transfers the charges at the odd and even sides of the sensor array e respectively, horizontal registers j' and k' which are disposed so as to be adjacent to the sensor array g and receives and transfers the charges at the odd and even sides of the sensor array f respectively, and horizontal registers l' and m' which are disposed so as to be adjacent to the horizontal register k' and receives and transfers the charges at the odd and even sides of the sensor g respectively.

The CCD sensor of this embodiment is further provided with a vertical register n for transferring the charge from each pixel of the sensor array f disposed at the center to each of the horizontal registers j' and k', an inter-horizontal-register transfer register o disposed between the horizontal registers h' and i', an inter-horizontal-register transfer register p disposed between the horizontal registers j' and k', and an inter-horizontal-register transfer register r disposed between the horizontal registers l' and m'.

A two-phase driving voltage φh1, φh2 is applied to each of the horizontal registers h', i', j', k', 1', m' to successively transfer the charges in the horizontal direction. Further, a voltage of φhh1 is applied to the inter-horizontal-register transfer register p, a voltage of φhh2 is applied to the inter-horizontal-register transfer register q, and a voltage of φhh3 is applied to the inter-horizontal-register transfer register o and the inter-horizontal-register transfer register r to control flow of the charges between the respective horizontal registers.

Further, a transfer gate is provided between each pixel of the sensor array e and the horizontal register i' and between each pixel of the sensor array g and the horizontal register j', and the charge picked up at each pixel can be transferred to each of the horizontal registers i', h' and the horizontal registers l', m' with the voltages φr1, φr2 applied to the transfer gates.

Still further, two-phase driving voltages φv1, φv2 and φv1, φv3 are alternately applied to the vertical register n so that the charges picked up at the odd sides and the charges picked up at the even sides of the sensor array f can be transferred to the horizontal registers j' and k', respectively.

As described above, in this embodiment, the three sensor arrays e, f, g are disposed as to be adjacent to one another in this order as in the case of the first embodiment, and thus the spatial displacement in the read-out of the pickup charges can be suppressed to a very small level. The three sensor arrays e, f, g are preferably disposed so as to be adjacent to one another, however, they may be disposed so as to be away from one another at intervals of 2 to 3 lines.

Next, the specific driving method for the CCD sensor will be described.

Figure 7A:
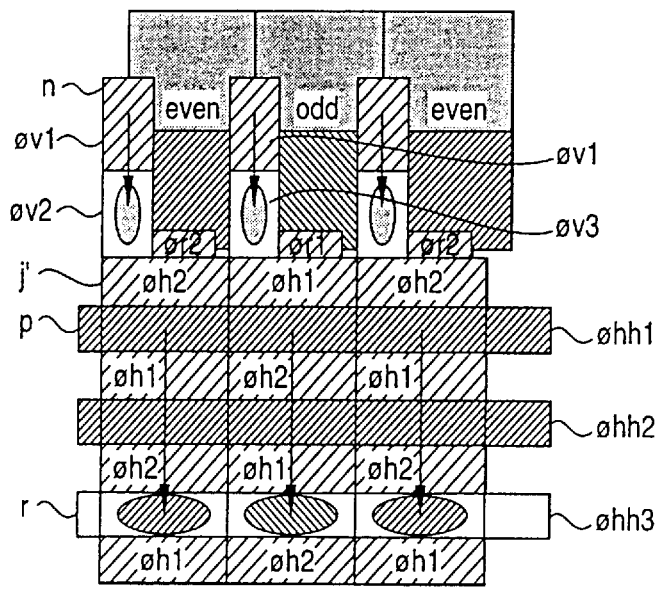
FIGS. 7A and 7B are diagrams (part 2) of the transfer process of the main part of the second embodiment.
Figure 7B:
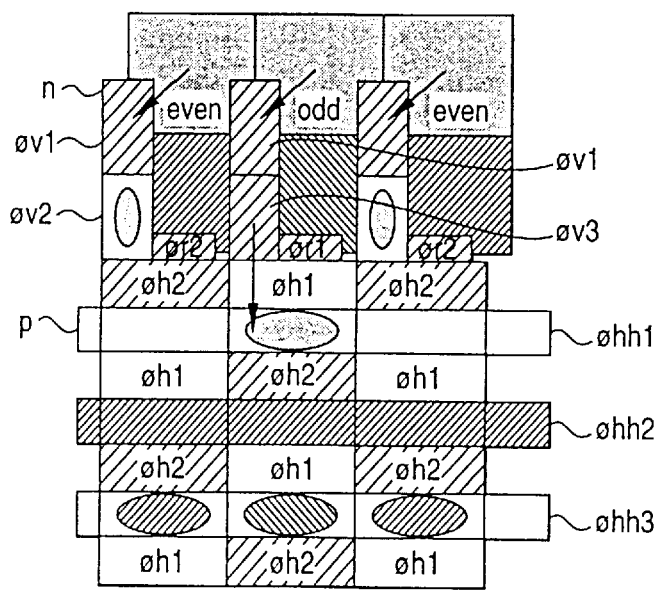
Figure 8:
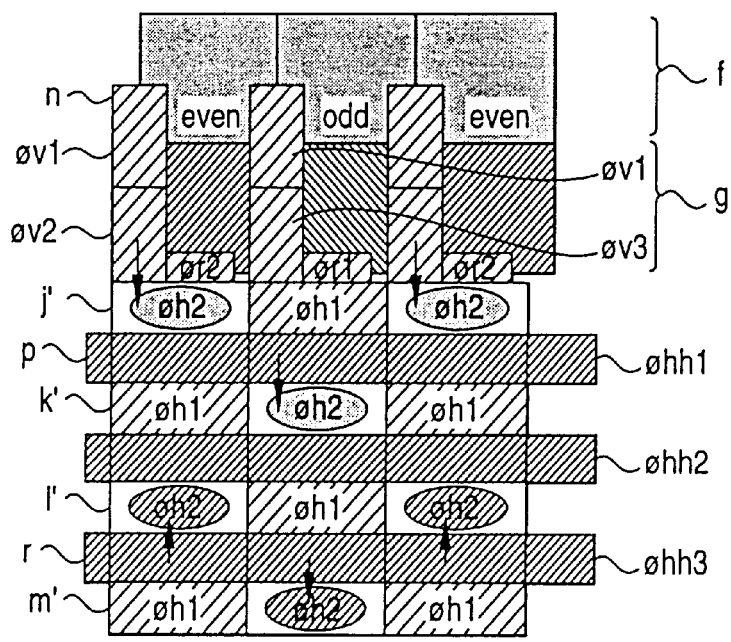
FIG. 8 is a diagram (part 3) of the transfer process of the main part of the second embodiment.
Figure 9:
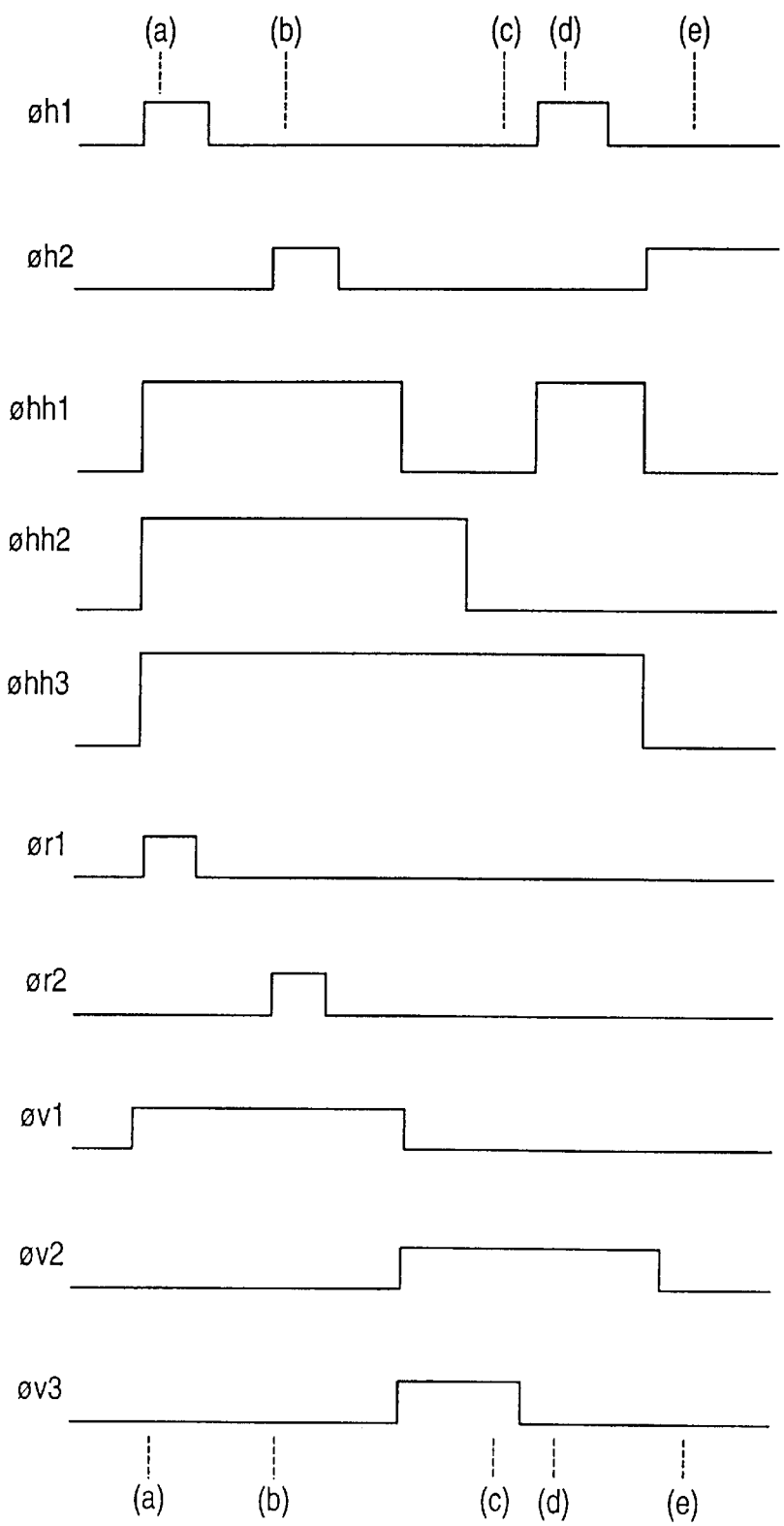
FIG. 9 is a timing chart for transfer in the second embodiment.

FIGS. 6A to 8 schematically show the charge transfer process of the main part in the step order, and FIG. 9 is a timing chart for the charge transfer process. In FIGS. 6A to 8, the transfer of charges stocked in the sensor arrays f, g is shown. In FIGS. 6A to 8, the charges are illustrated in an elliptical shape for convenience's sake of the description.

Figure 6A:
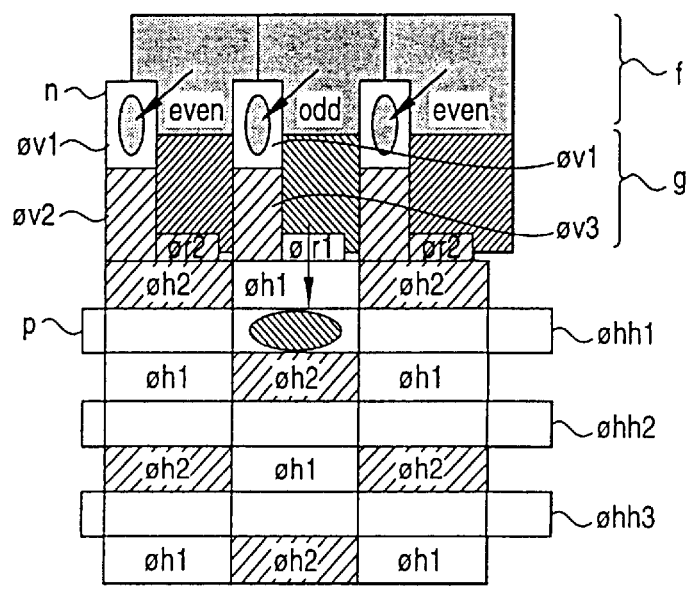
FIGS. 6A and 6B are diagrams (part 1) of a transfer process of a main part of the second embodiment in the step order.

First, when φh1 is set to High, φh2 is set to Low, φhh1 is set to High, φhh2 is set to High, φhh3 is set to High, φr1 is set to High, φr2 is set to Low, φv1 is set to High, φv2 is set to Low and φv3 is set to Low at a timing as shown by (a) of FIG. 9, the charge is transferred from each pixel of the sensor array f and the charges of the pixels at the odd side of the sensor array g are transmitted to the inter-horizontal-register transfer register p as shown in FIG. 6A.

The setting of φr1 to High at this timing causes the charges of the pixels at the even side of the sensor array e of FIG. 5 to be transferred to the horizontal register i'.

Figure 6B:
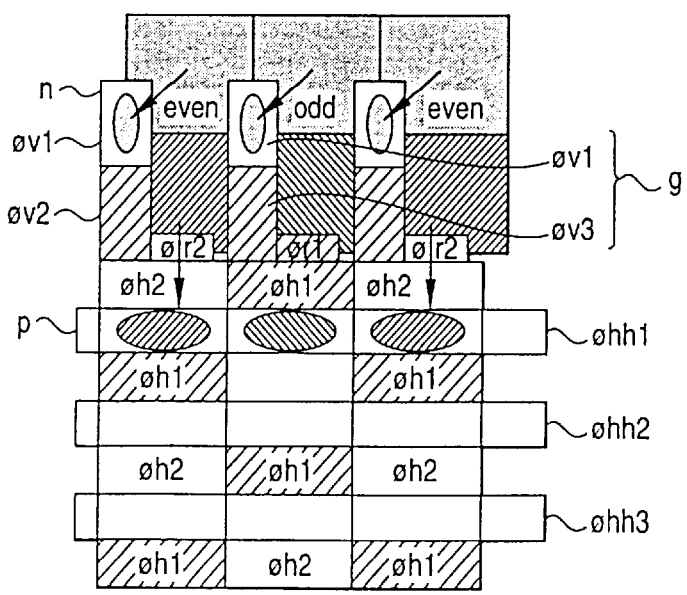

Subsequently, when φh1 is set to Low, φh2 is set to High, φhh1 is set to High, φhh2 is set to High, φhh3 is set to High, φr1 is set to Low, φr2 is set to High, φv1 is set to High, φv2 is set to Low and φv3 is set to Low at a timing as shown by (b) of FIG. 9, the charges of the pixels at the even side of the sensor array g are transferred to the inter-horizontal-register transfer register p as shown in FIG. 6B.

The setting of φr2 to High at this timing causes the charges of the pixels at the odd side of the sensor array e of FIG. 5 to be transferred to the horizontal register h'.

Subsequently, when φh1 is set to Low, φh2 is set to Low, φhh1 is set to Low, φhh2 is set to Low, φhh3 is set to High, φr1 is set to Low, φr2 is set to Low, φv1 is set to Low, φv2 is set to High, and φv3 is set to High at a timing as shown by (c) of FIG. 9, the charges transferred to the vertical register n are transferred to the preceding stage of the horizontal register j', and also the charges transferred to the inter-horizontal-register transfer register p are transferred to the inter-horizontal-register transfer register r as shown in FIG. 7A.

Subsequently, when φh1 is set to High, φh2 is set to Low, φhh1 is set to High, φhh2 is set to Low, φhh3 is set to High, φr1 is set to Low, φr2 is set to Low, φv1 is set to Low, φv2 is set to High and φv3 is set to Low at a timing as shown by (b) of FIG. 9, only the charges corresponding to the odd side in the charges transferred to the vertical register n are transferred to the inter-horizontal-register transfer register p as shown in FIG. 7B.

Subsequently, when φh1 is set to Low, φh2 is set to High, φhh1 is set to Low, φhh2 is set to Low, φhh3 is set to Low, φr1 is set to Low, φr2 is set to Low, φv1 is set to Low, φv2 is set to Low and φv3 is set to Low at a timing as shown by (e) of FIG. 9, as show in FIG. 8, the charges transferred to the inter-horizontal-register transfer register p are transferred to the horizontal register k', and the charges at the even side remaining in the vertical register n are transferred to the horizontal register j'. In addition, the charges corresponding to the odd side in the charges which are on standby in the inter-horizontal-register transfer register r are transferred to the horizontal register m', and the charges corresponding to the even side are transferred to the horizontal register l'.

Through the above operation, the charges of the pixels of the sensor arrays f, g are separated into the charges at the odd side and the charges at the even side, and then transferred to the horizontal registers j', k', l', m'. By successively applying φh1, φh2 in this state, each charge can be transferred in the horizontal direction.

With the above transfer operation, the charges which are picked up at the respective pixels of each sensor array e, f, g can be output with no time lag while separating the charges into the charges at the odd side and the charges at the even side. Further, the respective sensors are disposed so as to be adjacent to one another, and thus the spatial displacement in the read-out of the charges can be suppressed to a very small level. In addition, occurrence of color displacement, etc. can be prevented with providing neither memory nor correction circuit at the rear stage of the charge-to-voltage converter (not shown).

Next, a third embodiment according to the present invention will be described.

Figure 10:
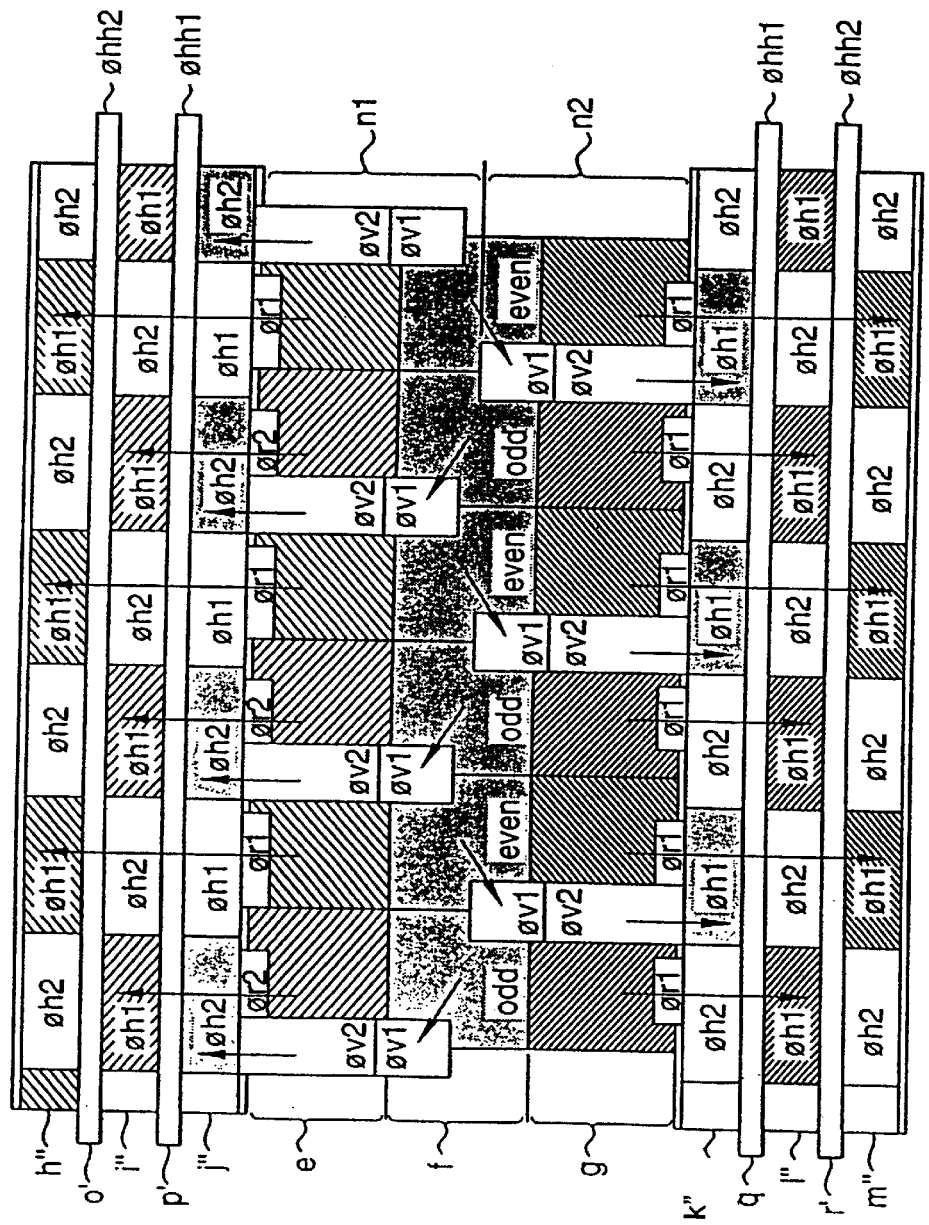
FIG. 10 is a schematic plan view showing a third embodiment according to the present invention.

FIG. 10 is a schematic plan view showing the third embodiment of the present invention. The CCD sensor of this embodiment includes sensor arrays e, f, g which are disposed so as to be adjacent to one another in this order in association with the three primary colors R (red), G (green) and B (blue), a horizontal register j" which is disposed so as to be adjacent to the sensor array e to receive and transfer the charges at the odd side of the pixels of the sensor array f, horizontal registers h" and i" which are respectively disposed so as to be adjacent to the horizontal register j" to receive and transfer the charges at the odd and even sides of the pixels of the sensor array e respectively, a horizontal register k" which is disposed so as to be adjacent to the sensor array g to receive and transfer the charges at the even side of the pixels of the sensor array f, and horizontal registers l" and m" which are disposed so as to be adjacent to the horizontal register k" to receive and transfer the charges at the odd and even sides of the pixels of the sensor array g, respectively.

The CCD sensor of this embodiment further includes a vertical register n1 for transferring the charges at the odd side of the pixels of the sensor array f disposed at the center to the horizontal register j", a vertical register n2 for transferring the charges at the even side to the horizontal register k", an inter-horizontal-register transfer register o' disposed between the horizontal registers h" and i", an inter-horizontal-register transfer register p' disposed between the horizontal registers i" and j", an inter-horizontal-register transfer register q' disposed between the horizontal registers k" and l", and an inter-horizontal-register transfer register' disposed between the horizontal registers l" and m".

A two-phase driving voltage φh1, φh2 is applied to each of the horizontal registers h", i", j", k", l", m" to successively transfer the charges in the horizontal direction. Further, φhh1 is applied to the inter-horizontal-register transfer registers p', q', and φhh2 is applied to the inter-horizontal-register transfer registers o', r', whereby the flow of charges between the respective horizontal registers is controlled.

Further, a transfer gate is provided between each pixel of the sensor array e and the horizontal register j" and between each pixel of the sensor array g and the horizontal register k", and the charges picked up at the respective pixels can be transferred to each of the horizontal registers h", i" and the horizontal registers l" and m" by applying φr1, φr2 to these transfer gates.

Still further, a two-phase driving voltage φv1, φv2 is applied to the vertical registers n1, n2 to transfer the charges picked up at the odd and even sides of the pixels of the sensor array f to the horizontal registers j", k".

As described above, according to this embodiment, as in the case of the first and second embodiments, the three sensor arrays e, f, g are disposed so as to be adjacent to one another in this order, so that the spatial displacement in the read-out of the pickup charges can be suppressed to a very small level. The three sensor arrays e, f, g are preferably disposed so as to be adjacent to one another. However, they are not necessarily required to be adjacent to one another, and may be disposed away from one another at intervals of about 2 to 3 lines.

Next, the specific driving method of the CCD sensor will be described.

Figure 11A:
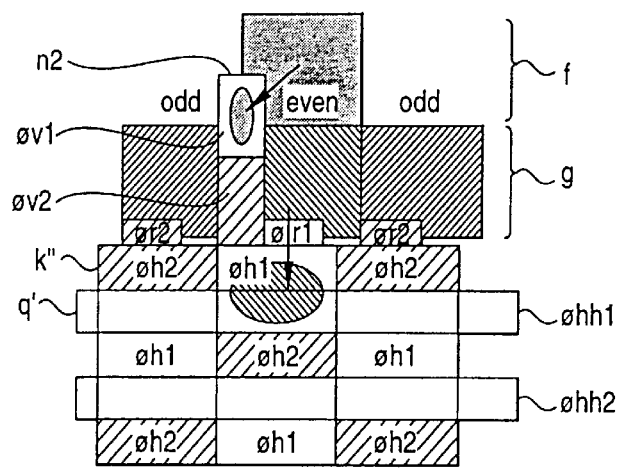
FIGS. 11A to 11C are diagrams (part 1) of the transfer process of the main part of the third embodiment in the step order.
Figure 11B:
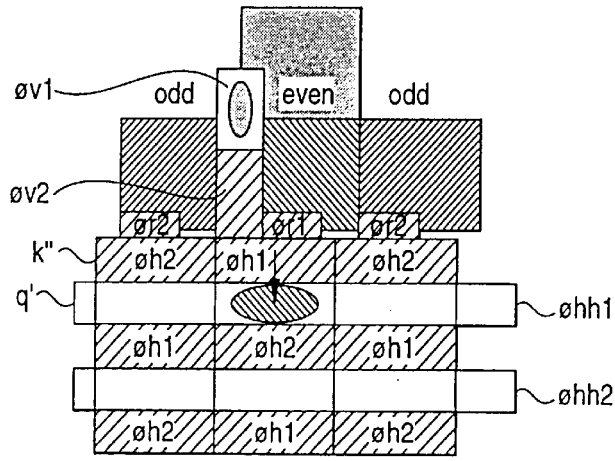
Figure 11C:
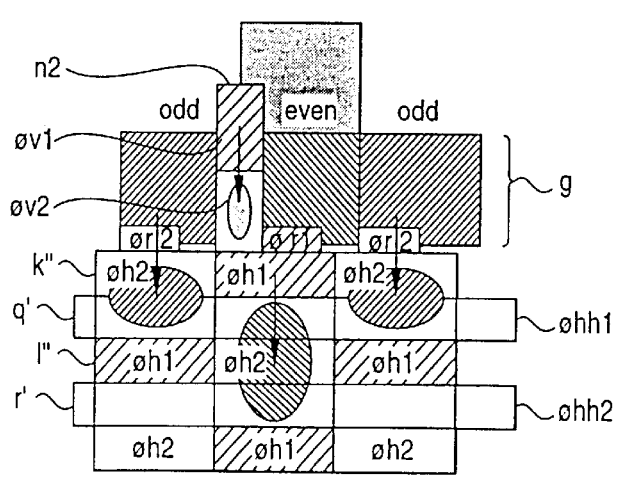
Figure 12A:
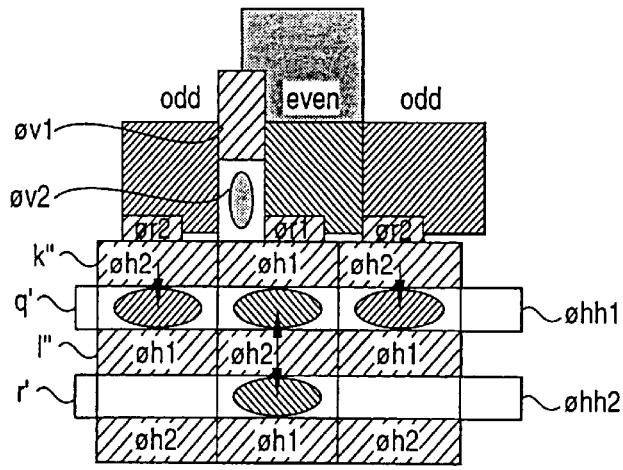
FIGS. 12A to 12C are diagrams (part 2) of the transfer process of the main part of the third embodiment.
Figure 12B:
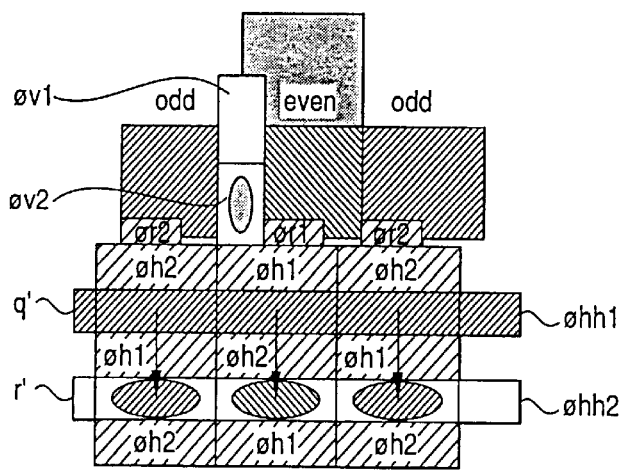
Figure 12C:
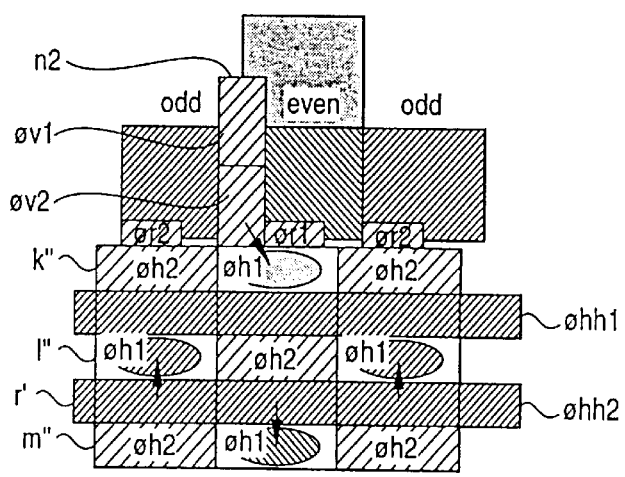
Figure 13:
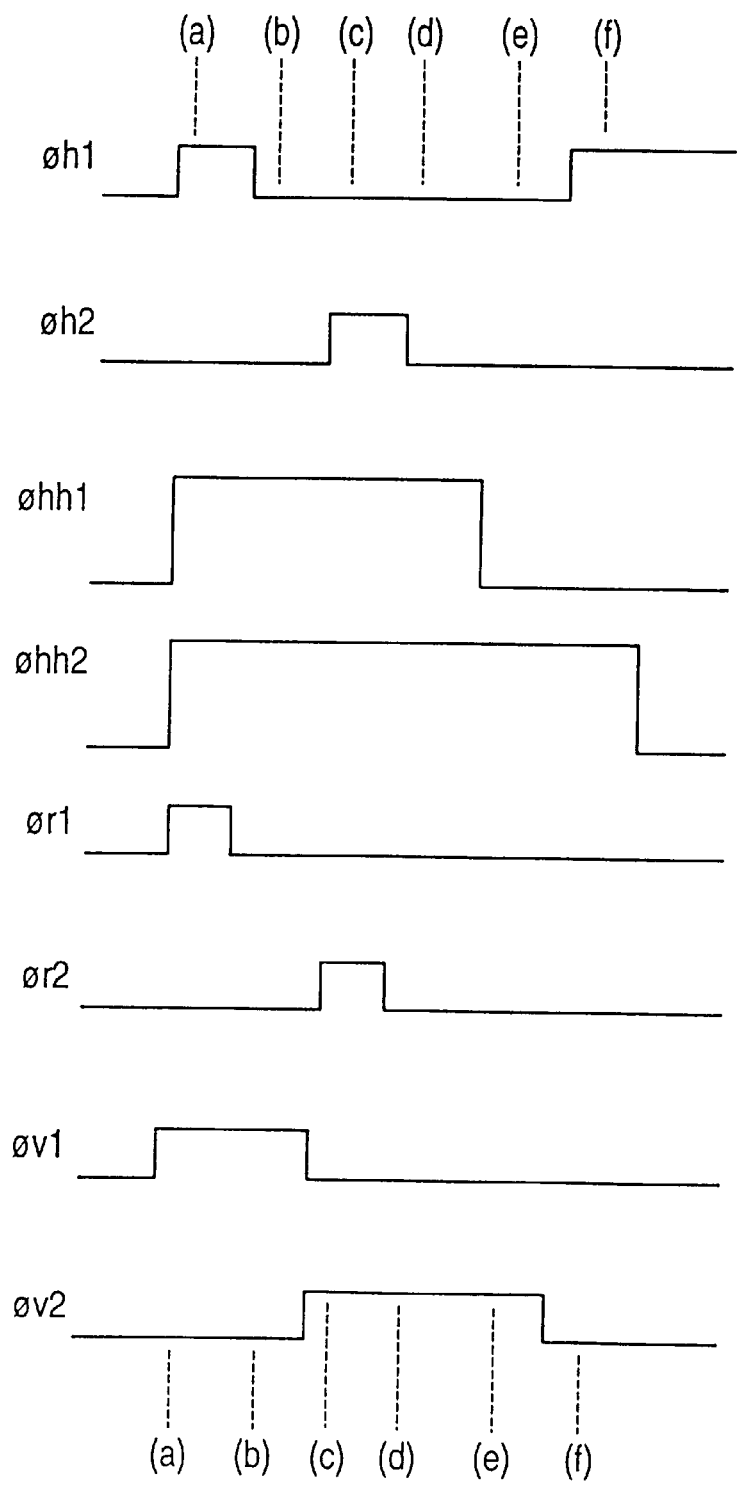
FIG. 13 is a timing chart for transfer in the third embodiment.

FIGS. 11A to 12C are schematic diagrams showing the transfer process of the main part of the present invention in the step order, and FIG. 13 is a timing chart for the transfer process. In FIGS. 11A to 12C, the transfer of the charges stocked in the sensor arrays f, g is illustrated. Further, in FIGS. 11A to 12C, the charges are illustrated in an elliptical shape for convenience's sake of description.

First, when φh1 is set to High, φh2 is set to Low, φhh1 is set to High, φhh2 is set to High, φr1 is set to High, φr2 is set to Low, φv1 is set to High and φv2 is set to Low at a timing as shown by (a) of FIG. 13, the charges of the pixels at the even side of the sensor array f are transferred to the vertical register n2, and the charges of the pixels at the even side of the sensor array g are transferred to the horizontal register k" and the inter-horizontal-register transfer register q' as shown in FIG. 11A.

At this timing, the charges of the pixels at the even side of the sensor array e shown in FIG. 10 are transferred to the horizontal register j" and the inter-horizontal-register transfer register p', and the charges of the pixels at the odd side of the sensor array f are transferred to the vertical register n1.

Subsequently, when φh1 is set to Low, φh2 is set to Low, φhh1 is set to High, φhh2 is set to High, φr1 is set to Low, φr2 is set to Low, φv1 is set to High, φv2 is set to Low at a timing as shown by (b) of FIG. 13, the charges transferred to the horizontal register k" and the inter-horizontal-register transfer register q' are collected into the inter-horizontal-register transfer register q' as shown in FIG. 11B.

The charges which are transferred to the horizontal register j" and the inter-horizontal-register transfer register p' shown in FIG. 10 at the above timing are collected into the inter-horizontal-register transfer register p'.

Figure 1:
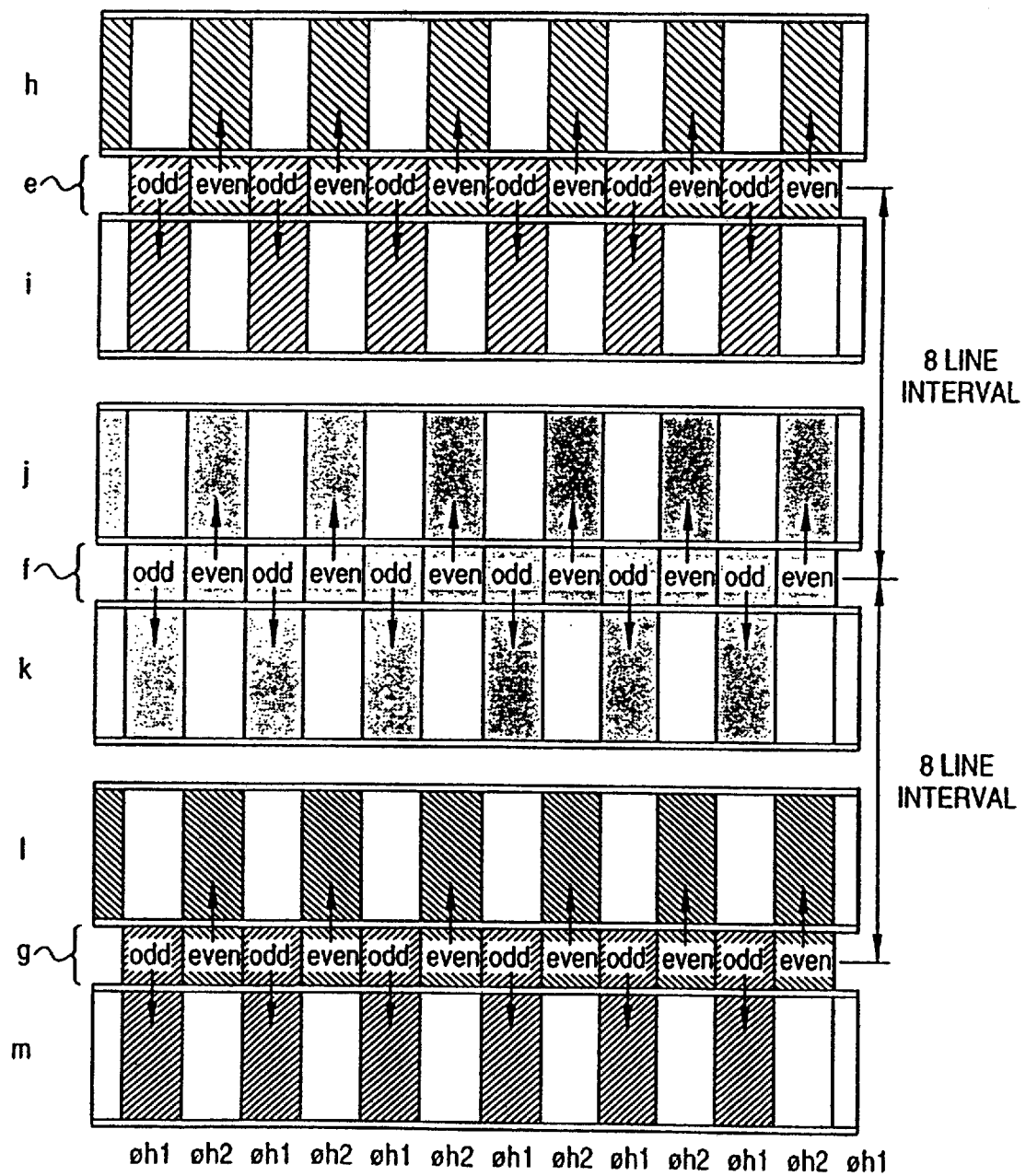
FIG. 1 is a schematic plan view showing the construction of a conventional CCD sensor.

Subsequently, when φh1 is set to Low, φh2 is set to High, φhh1 is set to High, φhh2 is set to High, φr1 is set to Low, φr2 is set to High, φv1 is set to low, φv2 is set to High at a timing as shown by (c) of FIG. 13, as shown in FIG. 1C, the charges transferred to the vertical register n2 are transferred to the preceding stage of the horizontal register k", and the charges of the pixels at the odd side of the sensor array g are transferred to the horizontal register k" and the inter-horizontal-register transfer register q'. In addition, the charges of the pixels at the even side of the sensor array g which are trapped in the inter-horizontal-register transfer register q' are transferred to the horizontal register l" and the inter-horizontal-register transfer register r'.

At this timing, the charges transferred to the vertical register n1 shown in FIG. 10 are transferred to the horizontal register j", and the charges of the pixels at the odd side of the sensor array e are transferred to the horizontal register j" and the inter-horizontal-register transfer register p'. In addition, the charges of the pixels at the even side of the sensor array e which are trapped in the inter-horizontal-register transfer register p' are transferred to the horizontal register i" and the inter-horizontal-register transfer register o'.

Subsequently, when φh1 is set to Low, φh2 is set to Low, φhh1 is set to High, φhh2 is set to High, φr1 is set to Low, φr2 is set to Low, φv1 is set to Low, φv2 is set to High at a timing as shown by (d) of FIG. 13, as shown in FIG. 12A, the charges which are transferred to the horizontal register k" and the inter-horizontal-register transfer register q' are collected into the inter-horizontal-register transfer register q', and the charges which are transferred to the horizontal register l" and the inter-horizontal-register transfer register r' are shared to the inter-horizontal-register transfer register q' and the inter-horizontal-register transfer register r'.

At this timing, the charges which are transferred to the horizontal register j" and the inter-horizontal-register transfer register p' shown in FIG. 10 are collected into the inter-horizontal-register transfer register p', and the charges which are transferred to the horizontal register i" and the inter-horizontal-register transfer register o' are shared to the inter-horizontal-register transfer registers p' and o'.

Subsequently, when φh1 is set to Low, φh2 is set to Low, φhh1 is set to Low, φhh2 is set to High, φr1 is set to Low, φr2 is set to Low, φv1 is set to Low and φv2 is set to High at a timing as shown by (e) of FIG. 13, as shown in FIG. 12B, the charges in the inter-horizontal-register transfer register q' are collected into the inter-horizontal-register transfer register r'. At this timing, the charges in the inter-horizontal-register transfer register p' shown in FIG. 10 are collected into the inter-horizontal-register transfer register o'.

Subsequently, when φh1 is set to High, φh2 is set to Low, φhh1 is set to Low, φhh2 is set to High, φr1 is set to Low, φr2 is set to Low, φv1 is set to Low and φv2 is set to Low at a timing as shown by (f) of FIG. 13, as shown in FIG. 12C, the charges in the vertical register n2 are transferred to the horizontal register k", and the charges associated with the odd side in the charges collected in the inter-horizontal-register transfer register r' are transferred to the horizontal register l" while the charges associated with the even side are transferred to the horizontal register m".

At this timing, the charges in the vertical register n1 shown in FIG. 10 are transferred to the horizontal register j, and the charges associated with the odd side in the charges collected in the inter-horizontal-register transfer register o' are transferred to the horizontal register i" while the charges associated with the even side are transferred to the horizontal register h".

Through the above operation, the charges of the pixels of each sensor array e, f, g are separated into the charges at the odd side and the charges at the even side and then transferred to the horizontal registers h", i", j", k", l", m". Each charge can be transferred in the horizontal direction by applying φh1, φh2 in this state.

With the above transfer process, the charges picked up at the respective pixels of each sensor array can be output with no time lag between the sensor arrays while dividing the charges into the charges at the even side and the charges at the odd side. Further, as the sensor arrays are disposed so as to be adjacent to one another, the spatial displacement in the read-out of the charges can be suppressed to a very small level, and occurrence of color displacement, etc. can be prevented even when neither memory not correction circuit are provided at the rear stage of the charge-to-voltage converter (not shown).

In the above-described embodiments, the present invention is applied to the CCD sensor which mainly includes sensor arrays of 3 lines. However, the present invention is not limited to this mode, and it is applicable to a CCD sensor having a large number of sensor arrays.

As described above, according to the solid-state image pickup device and the driving method therefor of the present invention, the following effect can be obtained. The distance between pixel arrays can be shortened by disposing at least two pixel arrays so as to be adjacent to each other, and the color displacement due to the distance between the pixel arrays can be greatly reduced. Accordingly, any memory is not required to be provided at the rear stage of the charge-to-voltage converter, and any correction circuit for color displacement is not required. Therefore, the cost of the solid-state image pickup device can be reduced.

What is claimed is:

1. A solid-state image pickup device, including:
   image pickup means comprising a first pixel array, a second pixel array and a third pixel array which are disposed so as to be adjacent to one another in this order;
   a first horizontal charge transfer means comprising a first pair of horizontal registers which are disposed adjacent to the first pixel array of the image pickup means, the first pair of horizontal registers being configured to receive and transfer charges at odd and even sides of the first pixel array;
   a second horizontal charge transfer means comprising a second pair of horizontal registers which are disposed adjacent to the second pixel array of the image pickup means, the second pair of horizontal registers being configured to receive and transfer charges at odd and even sides of the second pixel array;
   a third horizontal charge transfer means comprising a third pair of horizontal registers which are disposed adjacent to the third pixel array of the image pickup means, the third pair of horizontal registers being configured to receive and transfer charges at odd or even sides of the third pixel array;

a first inter-horizontal transfer register disposed between the first pair of horizontal registers, a second inter-horizontal transfer register disposed between the second pair of horizontal registers, a third inter-horizontal transfer register disposed between the third pair of horizontal registers wherein voltages are applied to the first, second and third inter-horizontal transfer registers to control the flow of charges between the first, second and third pair of horizontal registers; and vertical charge transfer arrays separate from the pixel arrays and disposed along the second pixel array for transferring the charge from each pixel of the second pixel array of the image pickup means to the second pair of horizontal registers.

* * * * *